(12) United States Patent
Fernandez-Alonso et al.

(10) Patent No.: US 8,064,891 B2
(45) Date of Patent: Nov. 22, 2011

(54) MEANS AND METHOD FOR CONTROLLING SERVICE PROGRESSION BETWEEN DIFFERENT DOMAINS

(75) Inventors: Susana Fernandez-Alonso, Madrid (ES); Victor Manuel Avila Gonzalez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1351 days.

(21) Appl. No.: 10/595,496

(22) PCT Filed: Oct. 24, 2003

(86) PCT No.: PCT/SE03/01654
§ 371 (c)(1),
(2), (4) Date: Nov. 27, 2006

(87) PCT Pub. No.: WO2005/041530
PCT Pub. Date: May 6, 2005

(65) Prior Publication Data
US 2007/0117548 A1    May 24, 2007

(51) Int. Cl.
*H04L 29/06* (2006.01)
(52) U.S. Cl. .............. 455/414.3; 455/410; 455/411; 455/418; 455/550.1; 455/524; 455/525; 455/556.2; 455/560; 455/561; 370/400; 370/401; 370/402
(58) Field of Classification Search .............. 455/410, 455/411, 414.3, 418, 550.1, 524, 525, 556.2, 455/560, 560.1; 370/400, 401, 402
See application file for complete search history.

(56) References Cited

U.S. PATENT DOCUMENTS

| 6,563,915 | B1 | 5/2003 | Salimando |
|---|---|---|---|
| 2002/0034939 | A1* | 3/2002 | Wenzel ................... 455/411 |
| 2004/0039827 | A1* | 2/2004 | Thomas et al. ............ 709/228 |
| 2004/0255048 | A1* | 12/2004 | Lev Ran et al. ........... 709/249 |
| 2004/0268148 | A1* | 12/2004 | Karjala et al. ............. 713/201 |
| 2005/0073982 | A1* | 4/2005 | Corneille et al. .......... 370/338 |

FOREIGN PATENT DOCUMENTS

WO   WO 02 103958 A    12/2002
WO   WO 03 047294 A    6/2003

* cited by examiner

*Primary Examiner* — Nick Corsaro
*Assistant Examiner* — Amanuel Lebassi

(57) ABSTRACT

At present, the existing mechanisms for authorizing a user of a service network operator to access a service provided by a third party service provider are valid for most of the existing services based on a request and an answer, but for transactional services, those where a service delivery implies several transactions, the existing techniques present serious limitations for the operators to fully control the progression of services. To overcome this limitation, the invention provides means and methods to control the progression of a service, service which requires a plurality of transactions, at a first domain where the service has been authorized while the user is using said service provided by a second domain, as well as a verification mechanism for verifying the use of the service between the service network operator and the service provider.

28 Claims, 9 Drawing Sheets

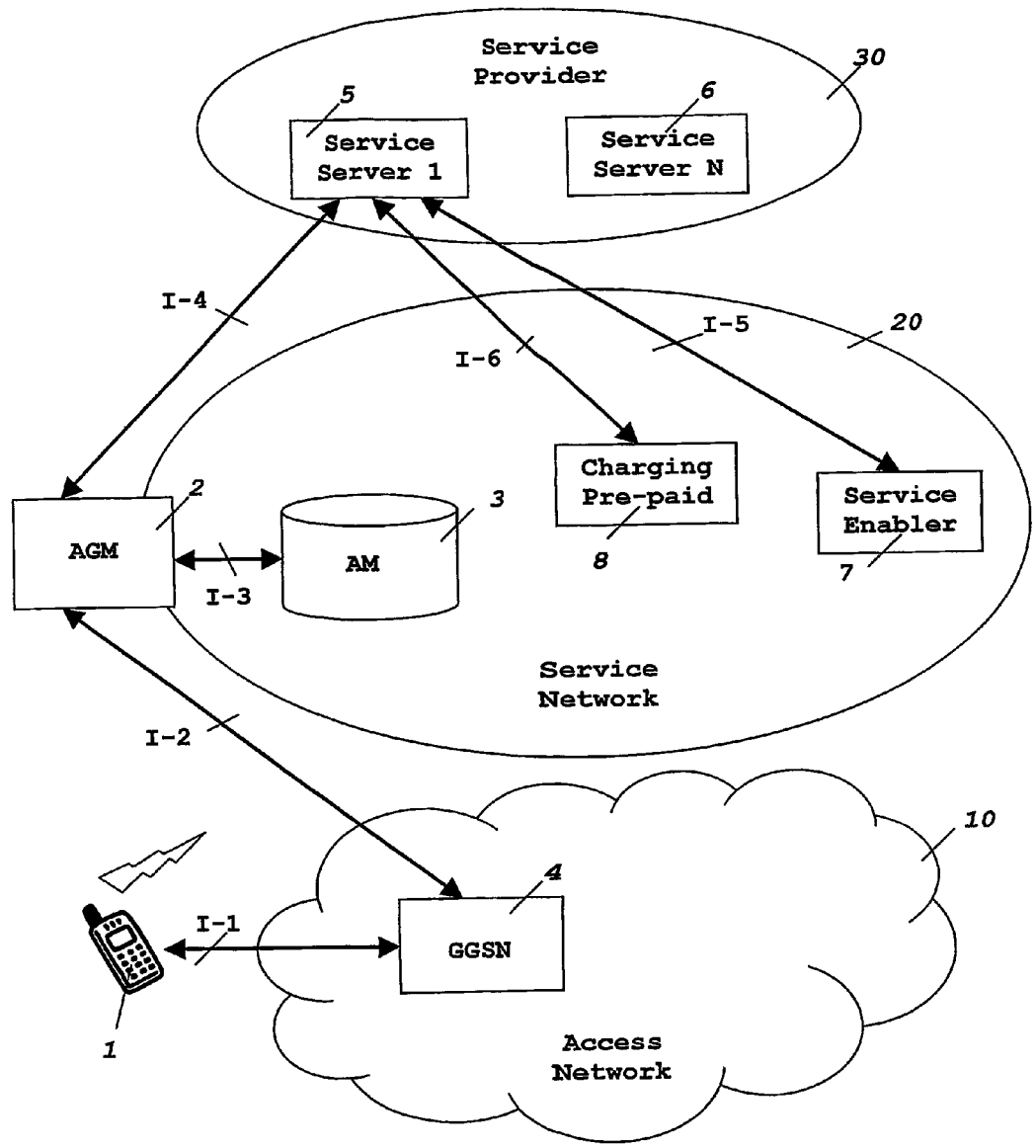
FIG.-1-
State of Art

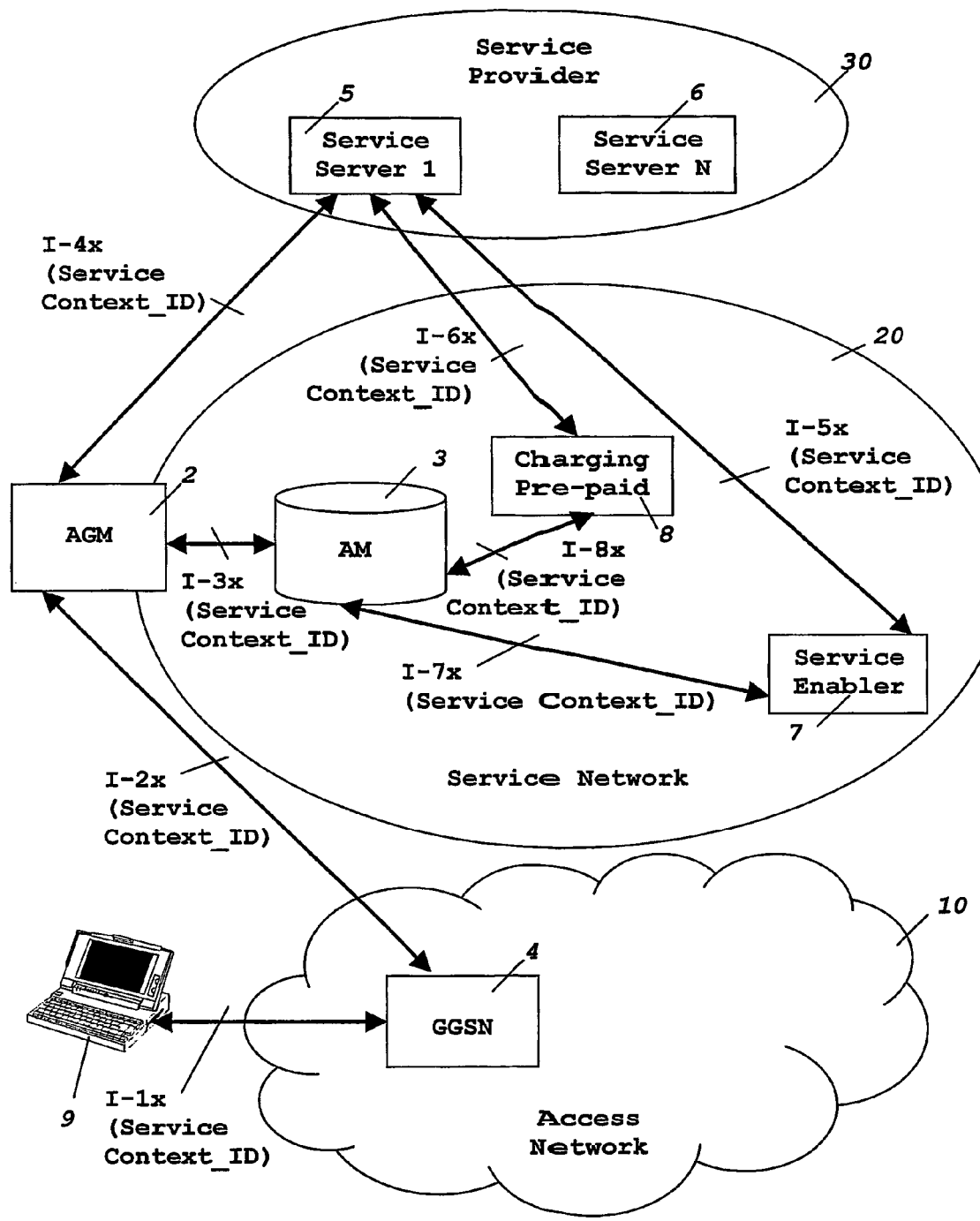
FIG.-2-

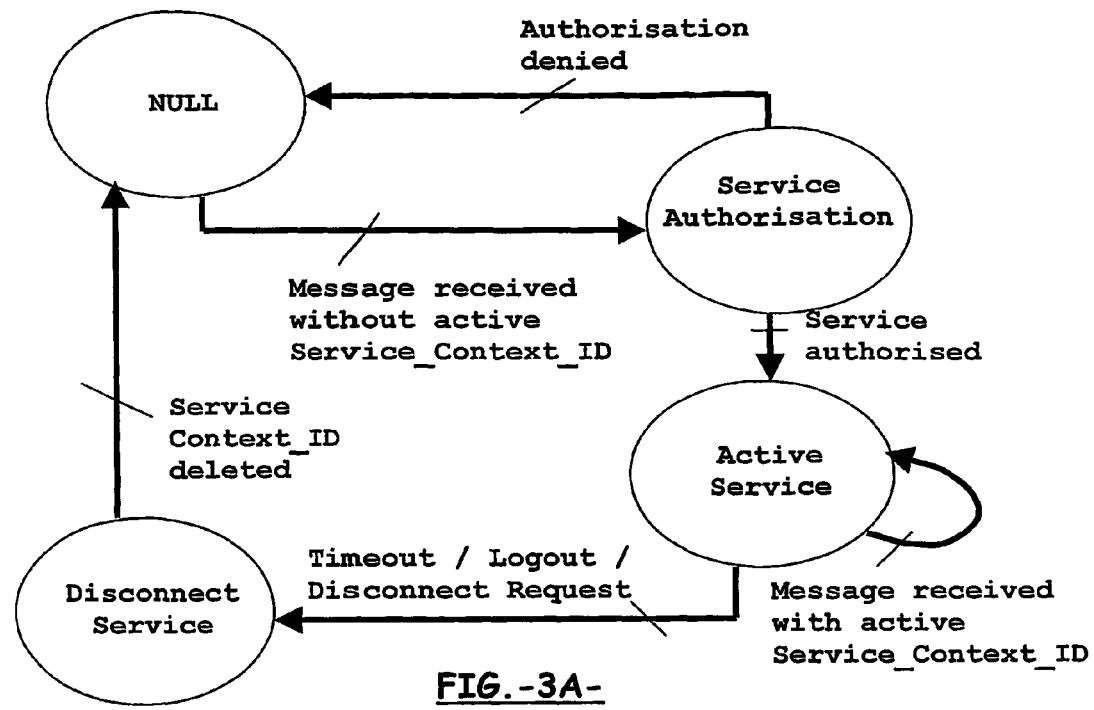
FIG.-3A-
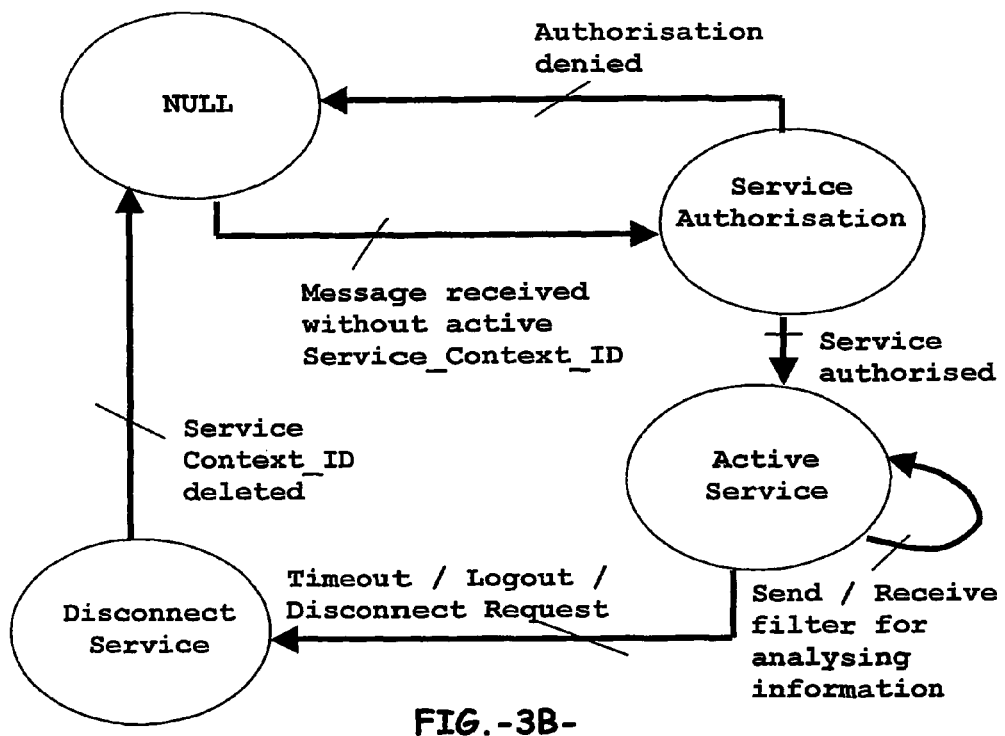
FIG.-3B-

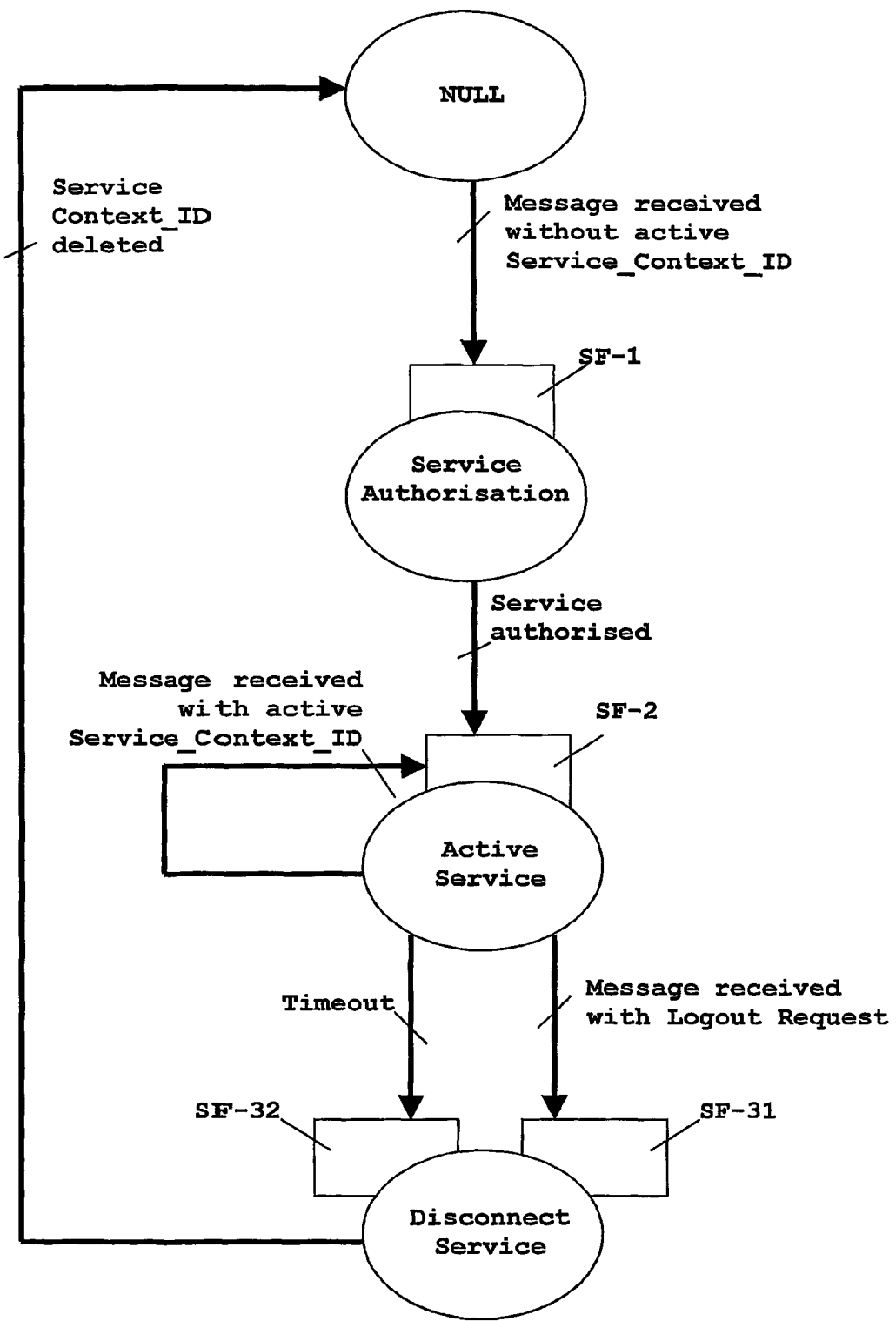
FIG.-4-

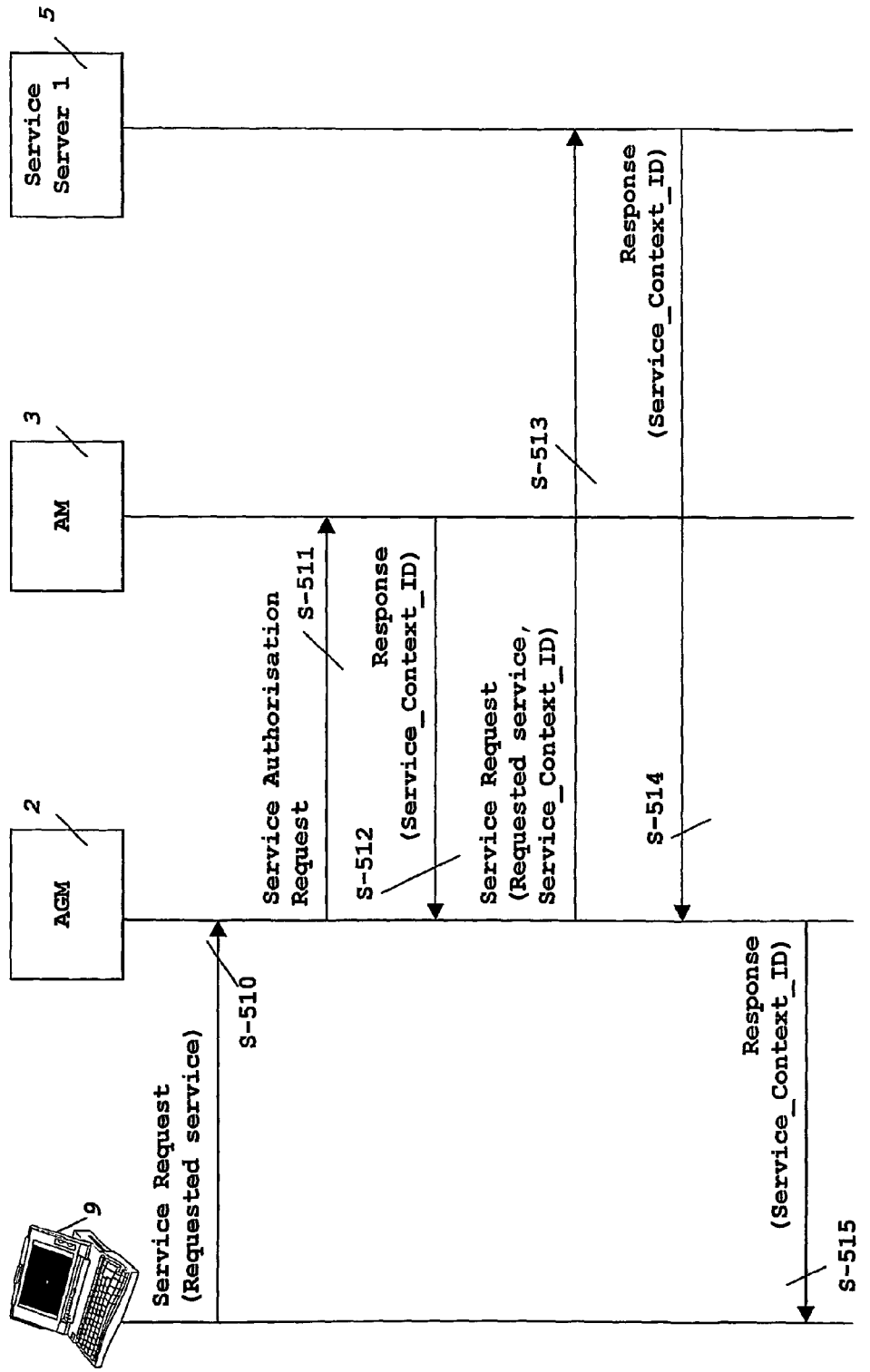
FIG. -5-

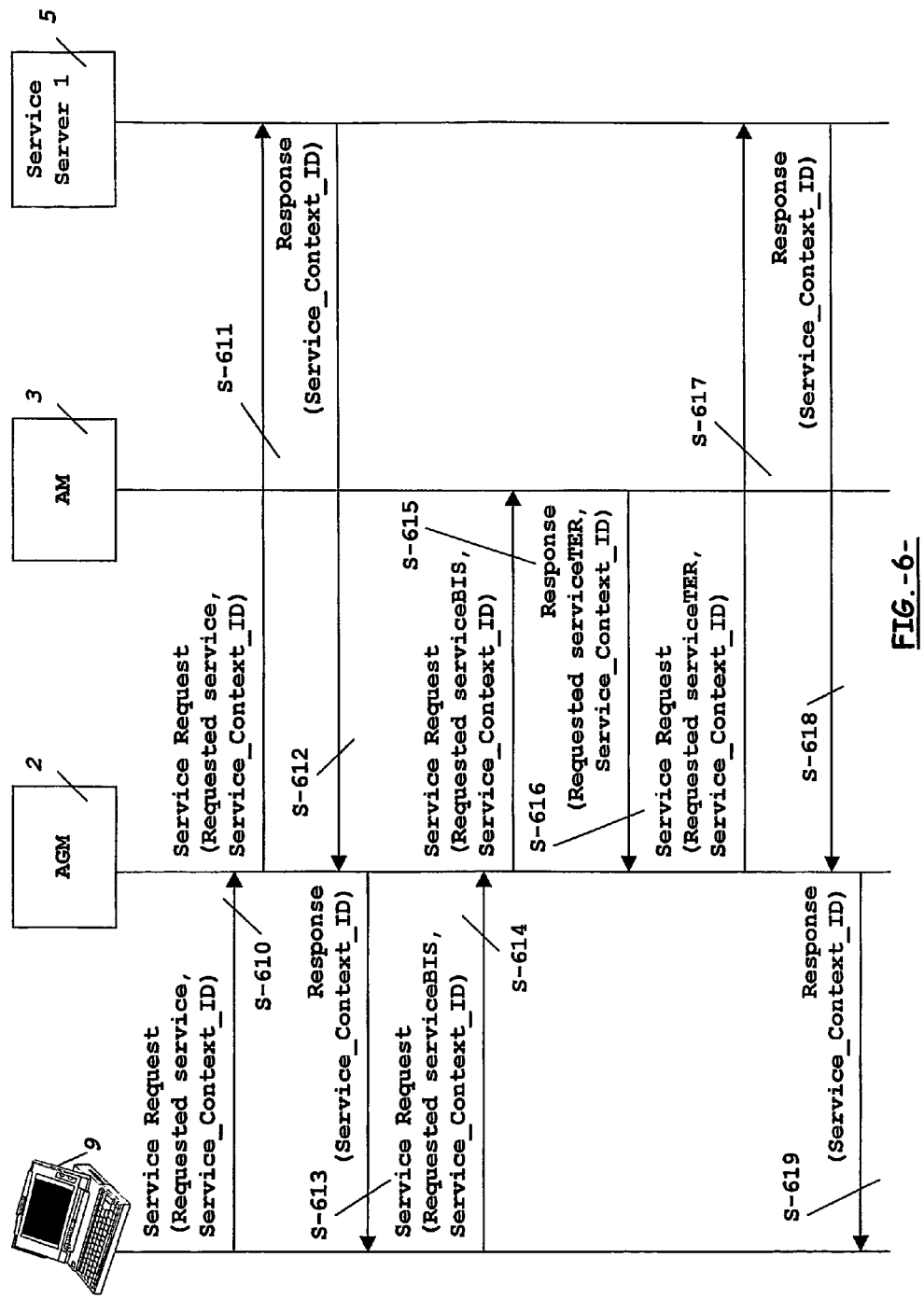
FIG.-6-

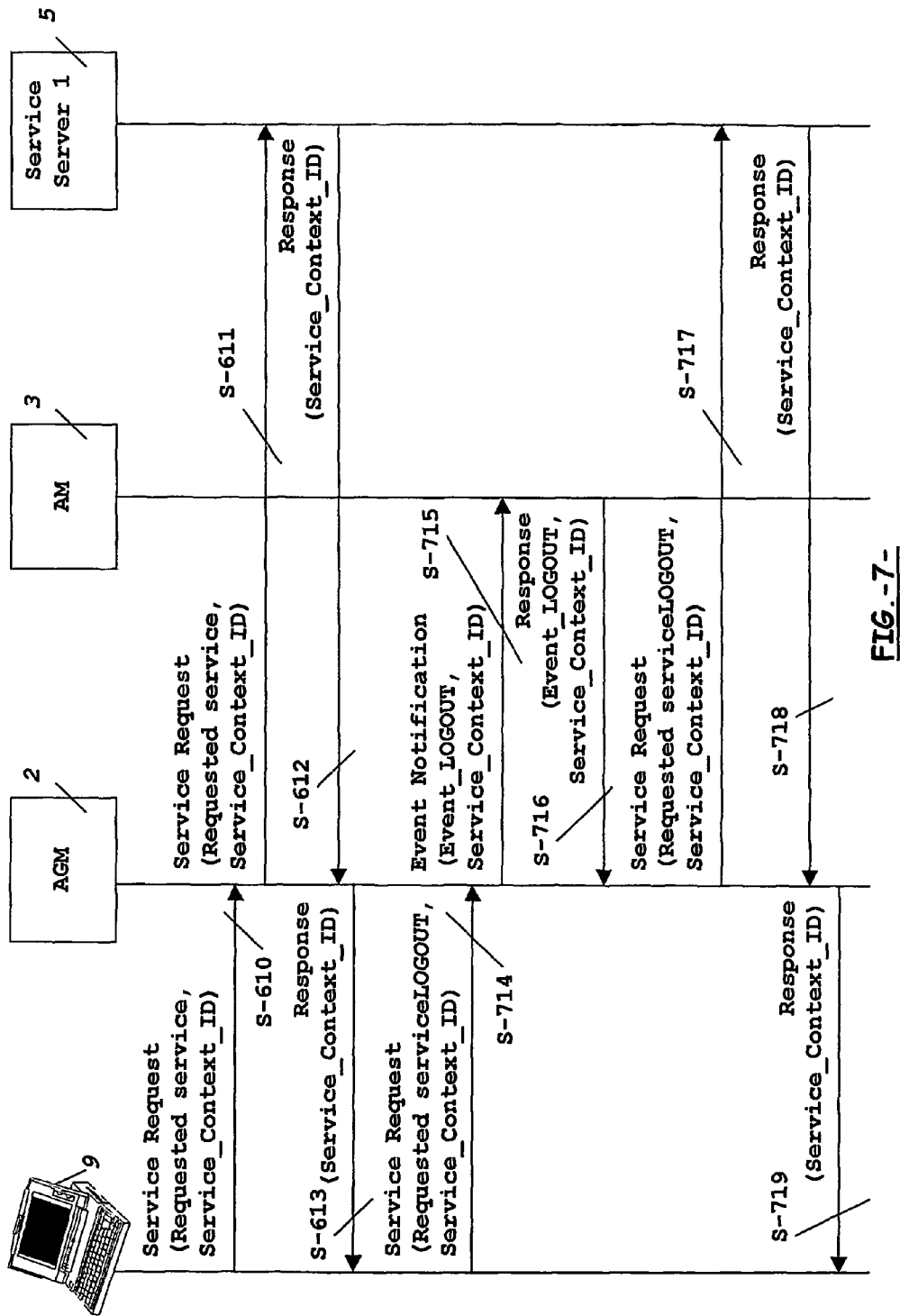
FIG. -7-

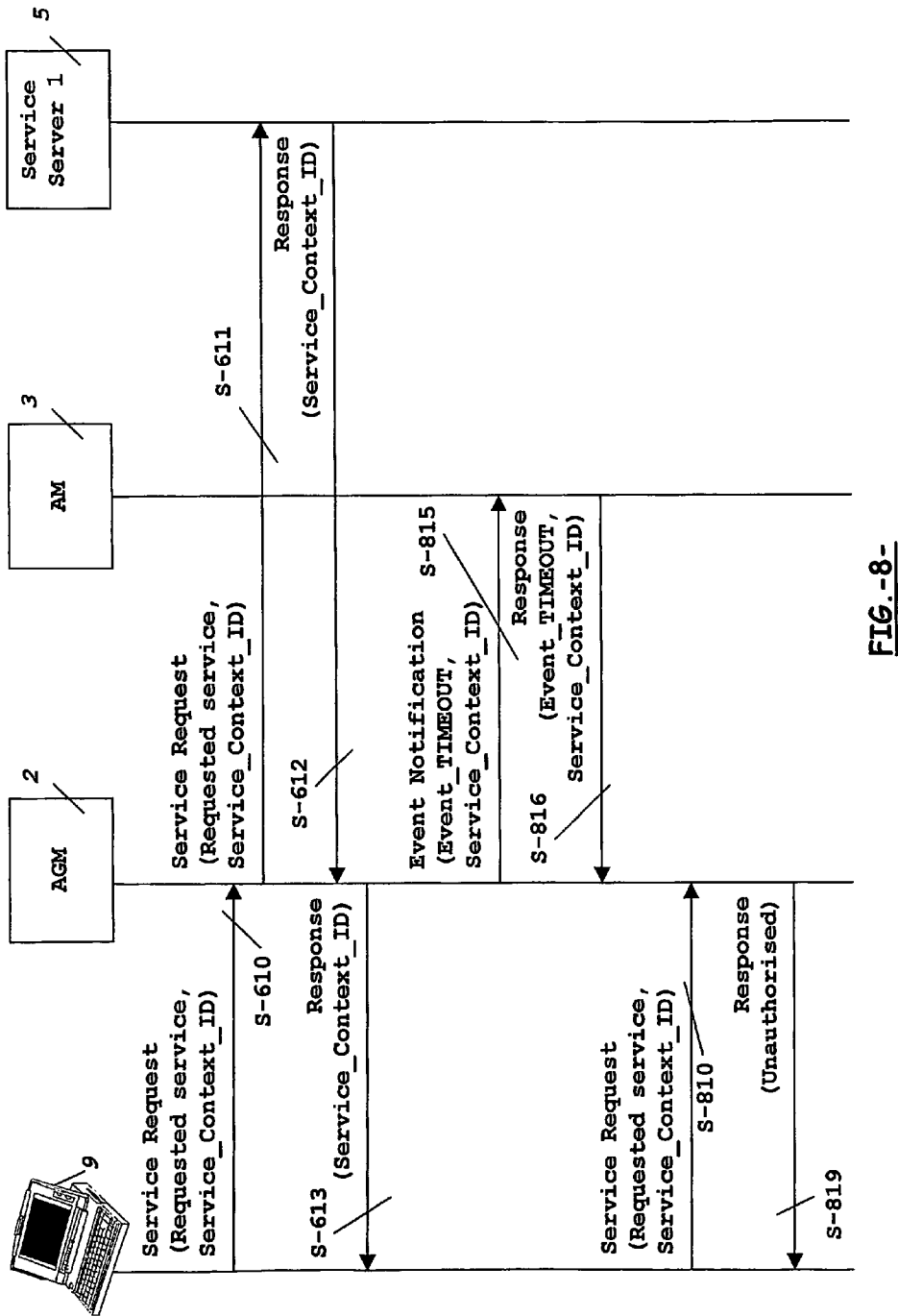
FIG.-8-

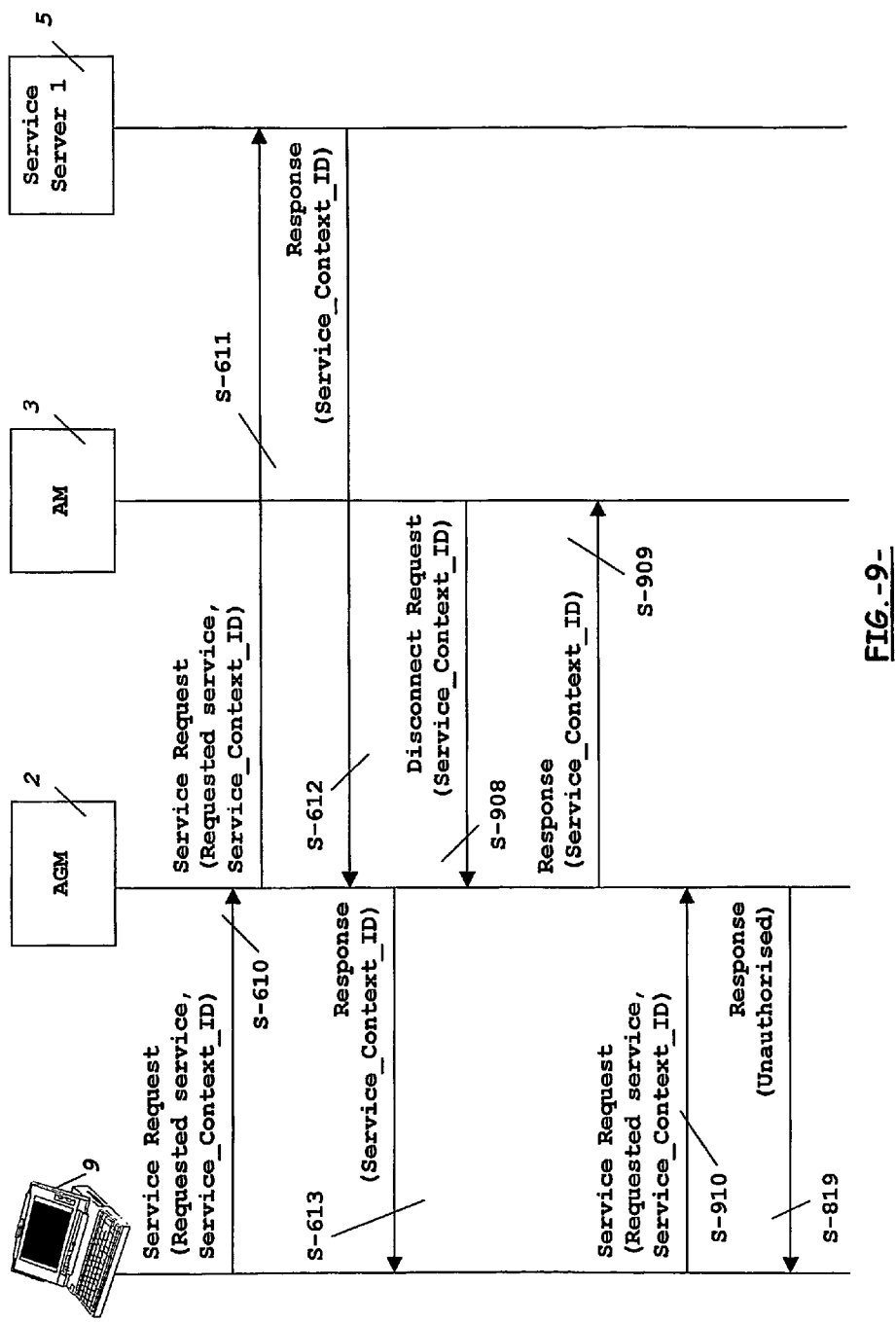
FIG.-9-

MEANS AND METHOD FOR CONTROLLING SERVICE PROGRESSION BETWEEN DIFFERENT DOMAINS

FIELD OF THE INVENTION

The present invention generally relates to the control of service progression when a first domain is responsible for authorising a user to access a service offered by a service provider in a second domain. More particularly, the present invention relates to the control of service progression when a service network authorizes the user to access a service offered by a service provider, and the service provider charges the user through operator's resources for the use of the service.

BACKGROUND

Network operators in general, and mobile operators in particular, are presently offering a wide range of services to their users and, very often, these services are actually provided by external service providers (SP). Thus, a network operator is acting as a virtual service provider for its users and charges them appropriately for the use of services, whereas external service providers actually provide said services and generate charging accounts to the operator for the provision of their services. Such network operator acting as a service provider for its users is hereinafter referred to as a Service Network Operator (SNO).

In this situation, a first domain represented by the SNO network is responsible for authenticating a user requesting a service, as well as for authorising the user accessing the requested service. This service being actually provided by a second domain owned by an external service provider likely having a commercial relationship with the network operator, but both domains likely owned by separate companies.

A currently known initiative supporting the above scenario is the Ericsson Service Delivery Platform (hereinafter referred to as ESDP) aimed to help the network operators to offer access-independent services to their subscribers. Generally speaking, ESDP considers that a subscriber accesses to services available in a Service Network via an industrially called "http reverse-proxy". Under this known approach, the user is authenticated in an Authentication-Authorisation-Accounting (AAA) server and, because of this authentication procedure, a master session is created. A master session typically includes information about the type of access, user identifiers, authentication mechanism to make use of, time of session establishment, etc. An active master session guarantees that the user is authenticated. However, the master session has no information about the services being used by the user. Thus, whenever a user tries to access a service in its profile, the master session is checked to determine whether the user had been authenticated before authorising the service.

This ESDP, as well as other known platforms in the industry, supports what has been generally referred to as Single Sign-On functionality, by virtue of which, a user accessing the SNO network through a trusted access network is authenticated just once to become authenticated for all services offered by the Service Network Operator (SNO).

For example, an exemplary scenario occurs when the trusted access network is a packet radio network like a General Packet Radio Service (GPRS) network and the user is assigned a Gateway GPRS Support Node (GGSN) for getting connectivity with a service network operator (SNO) domain.

In this scenario, the support for Single Sign-On (SSO) services is based on a so-called 'MSISDN forwarding' mechanism, wherein MSISDN traditionally stands for Mobile Subscriber ISDN Number though, in a broader sense, it can be assumed as a subscriber directory number. In brief, the 'MSISDN forwarding' mechanism is initiated from a Gateway GPRS Support Node (GGSN) in a home core network domain by sending a RADIUS Access Request message, which includes an MSISDN and an IP address for the user, towards an 'Authentication, Authorisation and Accounting' (AAA) server in the home service network domain. This information allows the AAA server to create a master session for the user so that whenever said user requests access to a service, the master session is checked to confirm that the user is already properly authenticated. More particularly, the international application with publication number WO 01/67716 A1 describes an 'MSISDN forwarding' mechanism based on a RADIUS Accounting Start message that can be applied under some scenarios. This international application describes features for supporting Single Sign-On and thus authenticating the user just once under some particular circumstances.

However, with regard to service authorisation, when a user has been authenticated once under the SNO network, the user is transparently granted the right to launch any provisioned service. Thus, once a service is authorised, the service network operator looses the control over the service. That is, the service network operator can not control any longer the progression of the service, is not aware of the actions carried out by the parties involved during the execution of the service, and can not take any action during this execution, such as disconnection of the service session to avoid a fraudulent misuse of the service.

A currently existing mechanism to authorize a service for a user, which is illustrated in FIG. 1, starts when the user issues a service request towards an access network, which in particular may be a GPRS network, being a GGSN the specific GPRS node receiving such request. The receiver sends this service request towards an Application Gateway Module (AGM) of the service network that is generally in charge of intercepting application messages between the user and the service, and identifying said user and said service. This Application Gateway Module (AGM), which in particular might be the above "http reverse-proxy", is conventionally provided with means for obtaining an authorization decision from a so-called Authorisation Module (AM) on whether or not the user is allowed to access the service. This Authorisation Module (AM), which in particular might be the above AAA server, is generally in charge of deciding whether or not a user is authorised to access a service depending on a number of conditions. Both entities, the Application Gateway Module and the Authorisation Module, can be provided in respective standalone mode or integrated with other entities, in particular both can be integrated in a same entity.

Nevertheless, the existing mechanisms are still valid for most of the nowadays existing services based on a request and an answer, such as requesting a ring melody and the download of said ring melody, but for more sophisticated transactional services, for instance services that include respective sequences of associated sub-services, the existing techniques present the above serious limitations for the operators to fully control the progression of services.

One simple solution for transactional services may be achieved by forcing any transaction between user and service to be authorised regardless any previous authorisation. However, this potential solution would hugely overload any traffic model and can be thus regarded as an additional drawback to solve.

On the other hand, given that the service network operator (SNO) does not realise when different transactions of a service take place, the service network operator can not be aware of the different actions carried out by the parties, namely user and service, and can not apply specific policies depending on such different actions. Moreover, the service network operator (SNO) cannot even disconnect a user in real time from using a service once the user is authorised to do so.

Thereby, an important object of the present invention is the provision of means and methods to control the progression of a service at a first domain where the service has been authorised while the user is using said service provided by a second domain.

It is a further object of the present invention to achieve a suitable solution wherein such control includes a further verification mechanism for verifying the use of the service.

SUMMARY OF THE INVENTION

The above objects, among other things, are accomplished in accordance with the invention by the provision of a method and means for controlling the progression of a service, said service requiring a plurality of transactions, at a first domain where the service has been authorised while the user is using said service provided by a second domain, as well as a verification mechanism for verifying the use of the service between the service network operator and the service provider.

In accordance with a first aspect of the present invention, there is provided an Application Gateway Module suitable for use in a telecommunication system wherein a service network authenticates a user and authorizes the user for accessing a service offered by a service provider, the Application Gateway Module arranged for intercepting application messages between the user and the service and for identifying said user and said service. This Application Gateway Module traditionally including means for obtaining an authorisation decision on whether the user is allowed to access the service and, in accordance with the invention, comprising:

means for assigning a service session identifier intended to identify those application messages exchanged between the user and the service and that belong to a same service delivery authorised for said user;

means for configuring a first finite-state machine with a number of status intended to identify specific events in service delivery where service progression can be controlled; and means for activating service policies applicable to said specific events and resulting in a state transition.

In this Application Gateway Module, the means for assigning a service session identifier may include means for initiating a specific instance of the first finite-state machine, said specific instance being identified by the assigned service session identifier.

Advantageously, the means for activating service policies in this Application Gateway Module include means for setting at least one element selected from a non-exhaustive list of references and attributes that comprises: a number of message field values to match, a number of specific actions to carry out on matching, a number of timer values to run, and a number of transactions to supervise. Moreover, these means for activating service policies include means for activating a global service policy independently of any service delivery in progress. Further, the means for activating service policies may preferably include means for initiating an instance of a global service policy to apply as an individual service policy within a specific instance of the first finite-state machine, the individual service policy inheriting references and attributes from the global service policy. In order to allow a dynamical update of service policies, the Application Gateway Module further comprises means for overwriting references and attributes of an individual service policy with new references and attributes during a service progression handled within a specific instance of the first finite-state machine.

In this Application Gateway Module, a particular state may be associated with a number of individual service policies within a specific instance of the first finite-state machine, said instance identified by a given service session identifier.

Moreover, and for the sake of clarity, the means for obtaining an authorisation decision in the Application Gateway Module may include means for requesting a service authorisation from a separate module, namely an Authorisation Module, that might be integrated with the Application Gateway Module in a unique entity, or both being provided as standalone modules.

Provided that both separate modules co-exist, the means for activating service policies in the Application Gateway Module preferably include means for receiving from said Authorisation Module at least one element applicable to set a service policy, the element selected from a non-exhaustive list of references and attributes that comprises: a number of message field values to match, a number of specific actions to carry out on matching, a number of timer values to run, and a number of transactions to supervise. Moreover, these means for activating service policies also include means for receiving a global service policy from said Authorisation Module. In this respect, an Application Gateway Module separate from an Authorisation Module also comprises means for receiving references and attributes from the Authorisation Module applicable to overwrite an individual service policy with new references and attributes during a service progression handled within a specific instance of the first finite-state machine. Consequently, the Application Gateway Module also comprises means for notifying to the Authorisation Module a specific event in service progression as well as means for requesting from the Authorisation Module a further processing to determine an appropriate action to go on with the service progression. Aligned with the latest feature above, the Application Gateway Module preferably comprises means for receiving from the Authorisation Module an instruction selected from: access granted without restriction, another service to substitute a previous service requested, a forced logout, and indication of a state transition.

Thus, in accordance with a second aspect of the present invention already introduced, there is provided an Authorisation Module suitable for use in a telecommunication system wherein a service network authenticates a user and authorizes the user for accessing a service offered by a service provider, the Authorisation Module arranged for deciding whether a user is allowed to access a service and traditionally having means for receiving a service authorisation request from an Application Gateway Module, and means for returning back to the Application Gateway Module a response on whether the user is granted access to the requested service or not. This Authorisation Module, in accordance with the invention, comprises:

means for generating a service session identifier intended to correlate those application messages exchanged between the user and the service and that belong to a same service delivery authorised for said user;

means for configuring a second finite-state machine with a number of status intended to identify specific events in service progression where the Authorisation Module can act over the Application Gateway Module to control the service progression; and means for determining service policies applicable to said specific events and resulting in a state transition.

In this Authorisation Module the means for generating a service session identifier comprise means for including said service session identifier in a response to be returned to the Application Gateway Module informing on whether the user is granted access to the requested service. Aligned with previous features in the Application Gateway Module, the means for generating a service session identifier preferably include means for initiating a specific instance of the second finite-state machine, said specific instance being also identified by said service session identifier. Thus, a particular state within a specific instance of the second finite-state machine may be associated with a number of service policies, the instance identified by a given service session identifier.

Moreover, the means for determining service policies in this Authorisation Module comprise means for including in a response towards the above Application Gateway Module at least one information element to activate a service policy within a specific state in the Application Gateway Module, said at least one information element selected from:

a number of message field values to match;

a set of actions to carry out on matching a given message field value;

a number of new timer values to run; and a number of transactions to supervise.

Apart from the above elements to be included in the response from the Authorisation Module towards the Application Gateway Module, additional means are provided to indicate whether this is a global service policy to apply independently of any service delivery in progress.

Moreover, and for the sake of coherence when both modules are at least functionally present, the Authorisation Module further comprises means for receiving a notification, from the Application Gateway Module indicating a specific event detected in service progression. Furthermore, the Authorisation Module also comprises means for receiving a request from the Application Gateway Module asking for an instruction to proceed with a service progression. In this respect, the Authorisation Module may advantageously comprise means for sending towards the Application Gateway Module an instruction selected from: access granted without restriction, another service to substitute a previous service requested, a forced logout, and indication of a state transition.

In addition, the Authorisation Module may further and advantageously comprise means for receiving an application message from at least one entity selected from a number of application servers and provisioning systems, the application message including a given service session identifier intended to identify a specific instance of the second finite-state machine in the Authorisation Module.

A method is also proposed by the present invention for authorising a user of a service network to access a service offered by a service server of a service provider, the user already authenticated by the service network, the server arranged to deliver a service that comprises a plurality of transactions by exchanging a plurality of application messages with the user, and the method traditionally comprising a step of obtaining a first authorisation decision on whether the user is allowed to access the service. This method also comprises, in accordance with the invention, the steps of:

generating and assigning a service session identifier intended to identify those application messages exchanged between the user and the service and that belong to a same service delivery authorised for said user;

configuring at least one finite-state machine with a number of status intended to identify specific events in service delivery where service progression can be controlled; and activating service policies applicable to said specific events and resulting in a state transition.

The step of generating and assigning a service session identifier in this method includes a step of initiating a specific instance of the at least one finite-state machine, said specific instance being identified by the assigned service session identifier. Moreover, a particular state within this specific instance may be associated with a number of service policies.

Furthermore, the step of activating service policies in this method may include a step of setting at least one element selected from a non-exhaustive list of references and attributes that comprises: a number of message field values to match, a number of specific actions to carry out on matching, a number of timer values to run, and a number of transactions to supervise.

Still further, this method may advantageously comprise a step of receiving at the service network an application message originated at an entity selected from: a number of service servers of a service provider, and a number of entities of a provisioning system, the application message including a given service session identifier intended to identify a specific instance of the at least one finite-state machine.

On the other hand, and for the sake of coherence with the two modules above, the step of configuring at least one finite-state machine in this method comprises a step of configuring a first finite-state machine in the above Application Gateway Module, and a step of configuring a second finite-state machine in the above Authorisation Module.

BRIEF DESCRIPTION OF DRAWINGS

The features, objects and advantages of the invention will become apparent by reading this description in conjunction with the accompanying drawings, in which:

FIG. 1 schematically represents an architecture wherein a service network authorizes an authenticated user for accessing a service offered by a service provider when the service is based on a request with an answer.

FIG. 2 shows a simplified view of the architecture in FIG. 1 with enhanced interfaces and entities in accordance with the invention.

FIG. 3A and FIG. 3B illustrate exemplary transition diagrams between basic states assigned during a service progression at an Application Gateway Module and at an Authorisation Module respectively.

FIG. 4 presents an exemplary diagram showing a number of Service Filters, namely service policies, that may be activated over states assigned during a service progression, as well as a number of transitions that may be encountered as applying the Service Filters.

FIG. 5 basically illustrates the procedure followed during a service authorisation, wherein new instances of a first state machine in an Application Gateway Module and a second state machine in the Authorisation Module are respectively initiated, and a service session identifier is generated and assigned to correlate said both instances.

FIG. 6 illustrates a procedure followed during an exemplary subsequent invocation within a given service delivery, wherein an Authorisation Module instructs an Application Gateway Module to activate a service policy for a specific transaction, so that the Authorisation Module is notified when the user requests such specific transaction.

FIG. 7 illustrates another procedure followed during an exemplary subsequent invocation within a given service delivery, wherein the user explicitly requests a logout from the service delivery identified by a given service session identifier.

FIG. 8 illustrates a further procedure followed after having carried out an exemplary subsequent invocation within a given service delivery, wherein the Application Gateway Module detects and notifies a timeout expiry to the Authorisation Module for the service delivery identified by a given service session identifier.

FIG. 9 basically illustrates a still further procedure followed during an exemplary subsequent invocation within a given service delivery, whereby the service network operator, acting through the Authorisation Module, can drop at any time the progression of a service delivery identified by a given service session identifier.

DETAILED DESCRIPTION OF PREFERRED EMBODIMENTS

The following describes currently preferred embodiments of means and methods for allowing a service network operator (20) to control the progression of service delivery, each service delivery likely involving multiple transactions, for services provided by an external service provider (30) and used by users of said service network operator.

Therefore an in accordance with a first aspect of the present invention, there is provided an Application Gateway Module (AGM) (2) having a finite state machine, such as the one illustrated in FIG. 3A, for tracking messages that belong to a same service delivery and for monitoring the service progression. That is, messages exchanged between a client (1; 9) and a service server (5; 6), from the time when a user is authorised to access a service until the service finishes, or the user explicitly abandons the service, or a timeout expires. For the sake of simplicity, the term client (1; 9) and the term user (1; 9) are indistinctly used throughout this specification, both referring to the user terminal side, whatever equipment (1; 9) is used to communicate with a service network (20), likely through an access network (10).

In accordance with a second aspect of the present invention, there is provided an Authorisation Module (AM) (3) that is also enhanced with another finite state machine, such as the one illustrated in FIG. 3B, to control the progression of the service delivery.

In a currently preferred embodiment, both entities AGM (2) and AM (3) are respectively provided in a standalone mode, though they both may be integrated in a unique entity likely sharing a unique finite state machine. Provided that an embodiment with separate AGM and AM entities is preferred as the one shown in FIG. 2, a new interface (I-3X) is provided between the two finite state machines. This new interface allows the Application Gateway Module (2) to request the Authorisation Module (3) for service authorisation and for informing of those relevant events occurring during the service progression. On the other hand, this interface enables the Authorisation Module (3) to grant and revoke a service authorisation and to take part in controlling the progression of the service delivery.

The finite state machine in the Application Gateway Module (2), a so-called Service Context State Machine (SCSM) in this specification, includes a number of states that a particular service delivery for a user may be assigned at the Application Gateway Module (2) during service progression. Thus, all application messages exchanged (I-2X, I-4X) between a user (1; 9) and a service server (5; 6) traverse an instance of a service context state machine (SCSM) at an Application Gateway Module (2) interposed between the user and the service server, wherein there is one SCSM instance for each service server. As commented before, a service delivery may involve a number of transactions, namely service transactions.

The finite state machine in the Authorisation Module (3), a so-called Service Progression State Machine (SPSM) in this specification, includes those states that a particular service delivery for a user may be assigned at the Authorisation Module (3) during the service progression. In addition, this Service Progression State Machine (SPSM) is used to let the Service Network (20) be aware of the progression of the service delivery. Moreover, this Service Progression State Machine (SPSM) in the Authorisation Module (3) may be also used to let the Service Network take part in the service delivery by requesting notification of certain events during the service progression, or by disconnecting the user from the service. As for the above SCSM in an Application Gateway Module (2), there is one instance of the SPSM in an Authorisation Module (3) for each service delivery, the service delivery likely involving a number of service transactions.

In accordance with the present invention, and in order to allow the SCSM in the Application Gateway Module (2) to track application messages that belong to a same service delivery, all application messages exchanged between the user (1; 9) and the service server (5; 6) include an individual service session identifier that is generated on a per service request basis, and alive during the service progression until the user explicitly abandons the service, the service is over, or a timeout expires. This service session identifier (Service_Context_ID) is thus used to identify in a unique way messages that belong to a same service delivery. To this end, there is provided means for generating service session identifiers on a per service request basis, these means preferably located at the Authorisation Module (3), and means for assigning an individual service session identifier to a specific service delivery, as receiving at the Application Gateway Module a service request from a user not including any service session identifier (Service_Context_ID).

The transition diagram in FIG. 3A shows basic states assigned during a service progression at the Application Gateway Module (AGM). Upon interception of a message from a user (1; 9) at the AGM (2) without an active service session identifier (Service_Context_ID), an authorisation request is sent to the Authorisation Module (3) whilst a transition between an initial 'NULL' state an a 'Service Authorisation' state occurs. Once the service has been authorised for the user, a service session identifier (Service_Context_ID) is generated at the Authorisation Module (3) and returned to the Application Gateway Module (2) whilst a transition occurs between the states 'Service Authorisation' and 'Active Service'. At this stage, application messages from the user (1; 9) towards the service server (5; 6) that include this active service session identifier (Service_Context_ID), when intercepted by the application Gateway Module (2), do not produce any transition in the exemplary diagram of FIG. 3A, though anyone skilled in the art might distinguish other significant states that might be useful under particular or advantageous implementations. Thus, this instance of the Service Context State Machine (SCSM) illustrated in FIG. 3A remains in the 'Active Service' state until a service logout, or a timeout expiry, or a disconnection request occurs what triggers a transition towards a 'Disconnect Service' state until the service session identifier (Service_Context_ID) and corresponding references and attributes are definitely deleted. Once the individual service session identifier (Service_Context_ID) and said corresponding references and attributes have been definitely deleted, a final transition is carried out in this instance of the Service Context State Machine (SCSM) between the 'Disconnect Service' state and the 'NULL' state, the latter being considered the initial state when the service is requested and the final state when the service has finished.

In a similar manner as the above Service Context State Machine (SCSM) works in the Application Gateway Module (2), the Service Progression State Machine (SPSM) does in the Authorisation Module (3). The Service Progression State Machine (SPSM), as basically illustrated in FIG. 3B, includes the same substantial states and corresponding transitions as the above Service Context State Machine (SCSM) in FIG. 3A, with slight modifications required to carry out additional advantages further explained.

The Service Context State Machine (SCSM) in the Application Gateway Module (2) incorporates means for identifying points in service progression where the Application Gateway Module (2) and the Authorisation Module (3) may communicate each other to respectively carry out suitable and corresponding state transitions between the Service Context State Machine (SCSM) and the Service Progression State Machine (SPSM).

Moreover, means are provided to set policies in these points which are applied over incoming application messages. A policy, which is hereinafter called Service Filter (SF), may be understood as a collection of criteria to match and a set of actions to carry out over a particular application message where the policy applies. In particular, a criterion may be a timer expiry ('Timeout') and a policy having such criterion might as well have an action associated to force a disconnection.

A Service Filter (SF-1, SF-2, SF-3 SF-4) can be armed, namely activated, in such a manner that an incoming application message, from the user (1; 9) or from the service (5; 6), is evaluated in respect of said criteria and, in case the outcome is successful, the evaluation may result in a sort of notification, or request, exchanged between the Application Gateway Module (2) and the Authorisation Module (3), as well as likely trigger a state transition. Provided that a Service Filter (SF-1; SF-2; SF-3; SF-4) is not armed, or it is not set, for an incoming application message, the Service Context State Machine (SCSM) continues with the processing of the incoming application message without any interaction.

Currently, different sets of service filter types are identified. A first type of service filter that the present invention provides for is the 'trigger' type, by virtue of which a service filter thus defined is statically armed to enter into operation. A second type of service filter that the present invention provides for is the 'event' type, by virtue of which a service filter thus defined is dynamically armed to enter into operation. For the purpose of the present invention, 'statically armed' is understood as activated during the applicable configuration of the Application Gateway Module (2) and Authorisation Module (3), which may occur during provisioning of operation data for example, whereas 'dynamically armed' is understood as activated during the service progression.

In addition, sub-types, such as 'Request' and 'Notification', may also be defined for a particular type. The former applies when the processing of a service progression is suspended until receiving an appropriate order to resume it, whereas the second does not necessarily imply a service suspension.

In accordance with the above classification, the following sets of service filters may turn up in a nowadays preferred embodiment:

'Trigger-Request' (SF-TR), which is a service filter statically armed and responsible for triggering a state transition in an SCSM instance and for suspending the service progression when encountered, such as a service filter set for triggering the service authorisation itself;

'Trigger-Notification' (SF-TN), which is a service filter statically armed and responsible for firing a notification towards another entity whilst going on with the service progression, such as a timeout indication submitted to the Authorisation Module (3) for example;

'Event-Request' (SF-ER), which is a service filter dynamically armed with specific criteria set by additional operation means and responsible for suspending the service progression when encountered until receiving further instructions from another entity, such as for example an Application Gateway Module (2) waiting for instructions from an Authorisation Module (3) in respect of a new sub-service request for a pre-paid download; and 'Event-Notification' (SF-EN), which is a service filter dynamically armed with specific criteria set by additional operation means and responsible for firing a notification towards another entity whilst going on with the service progression, such as an indication of a user acceptance to receive further advertisements submitted to the Authorisation Module (3) for example.

For example, FIG. 4 shows a number a Service Filters that may be armed over the Service Context State Machine (SCSM) in the Application Gateway Module (2). Under this embodiment, Service Filters 'Authorisation-Request' (SF-1) and 'Timeout' (SF-32) are armed before arrival of the first message to invoke the service. One might wonder how these Service Filters (SF-1; SF-32) can be armed before the arrival of the first message since at that time an SCSM instance has not been created yet. However, a currently preferred embodiment of the invention provides for a sort of global Service Filters, which are statically armed as commented above, that are thus operative before initiating an SCSM instance. At the time of initiating a particular SCSM instance, corresponding individual Service Filters are also instanced by inheriting references and attributes from said global Service Filters and, in particular, further additional operating means are provided for overwriting an individual Service Filter such as 'Timeout' (SF-32) under some conditions within an SCSM instance, whereas other Service Filters such as 'Information-Analysis' (SF-2) and 'Logout-Request' (SF-31), which are rather arranged for being dynamically armed, may be successively armed during the progression of the service.

Regarding other technical features, Service Filters 'Authorisation-Request' (SF-1) and 'Information-Analysis' (SF-2) may be used to evaluate fields in those messages received under a particular service delivery identified by an individual service session identifier (Service_Context_ID) which the SCSM instance is used for. If the contents of the fields subjected to inspection match with the applicable filter values when traversing an SCSM instance, the Application Gateway Module (2) fires a message towards the Authorisation Module (3) whilst, depending on the filter sub-type evaluated, the progression of the service continues without interruption, or is interrupted until arrival of a corresponding answer from the Authorisation Module (3).

A number of use cases are further described in an illustrative and non-restrictive manner in terms of procedures followed for a service authorisation, for handling of subsequent messages of a same service delivery, for a service logout, for a timeout expiry, and for a service disconnection.

In a first use case illustrated in FIG. 5 and with references also to FIG. 2, new instances of a first state machine (SCSM) in an Application Gateway Module (2) and a second state machine (SPSM) in an Authorisation Module (3) are respectively initiated during a service authorisation, wherein a service context identifier (Service_Context_ID) is generated and assigned to correlate said further first and second (SCSM, SPSM) state machines instances. The procedure starts when a user (9) is trying to access a service (5) offered through an operator's service network (20). Therefore, the user issues a Service Request (S-510) that includes a service identifier, such as an HTTP Request-URI, together with a user identifier.

Upon reception of this incoming message, namely a Service Request, the Application Gateway Module (2) checks whether there is an active service session identifier (Service_Context_ID) for this request. As this is the first service request received for the user (9) to access this service there is no associated service session identifier, so that a new SCSM instance is initiated.

At this point, and in accordance with one embodiment of the invention, global Service Filters are correspondingly instanced as individual Service Filters with the required inheritance relationships. For instance, a Service Filter 'Authorisation-Request' (SF-1) of a type 'Trigger' is applied as outcome from the state 'NULL' to invoke a service authorisation request towards the Authorisation Module (3). Nevertheless, and in accordance with another embodiment of the invention, these global Service Filters may be simply treated and understood as general policies to be further applied for all messages encountering a pre-determined state in their particular SCSM instance. For example, once a particular service delivery is in state 'NULL', the first action to trigger is the invocation of a service authorisation request towards the Authorisation Module (3). A still further embodiment may be carried out wherein all the Service Filters are download by provisioning means, wherein those said to be statically armed are already active from the provisioning time onwards, and those said to be dynamically armed are activated during the service progression upon reception of individual orders and likely individual values to match for this purpose.

Irrespective of the choice between the previous embodiments for provisioning and arming Service Filters, a transition is thus produced in this new SCSM instance from a 'NULL' state to a 'Service-Authorisation' state, when the Application Gateway Module (2) requests (S-511) from the Authorisation Module (3) the authorisation of the service requested by the user. To this end, the Application Gateway Module (2) may include in the service authorisation request at least one information element selected from: protocol used, such as for example HTTP; message type, such as for example POST; requested service, such as for example a requested URI; a user identifier; and a possibly applicable Service Filter.

Upon reception of the service authorisation request, the Authorisation Module (3) identifies the user, applies corresponding policies to the user for the requested service and, based on that, the Authorisation Module grants or denies the access to the service. Provided that the access is authorised, and assuming that the Authorisation Module had been configured to control the service progression between the Authorization Module (3) and the Application Gateway Module (2), the Authorisation Module initiates a new instance of a Service Progression State Machine (SPSM), wherein a transition occurs from a 'NULL' state to a 'Service-Authorisation' state, and generates a new service session identifier (Service_Context_ID) for this service delivery to be further downloaded towards the Application Gateway Module (2).

In addition, and associated with different states included in the Service Progression State Machine (SPSM), means are provided to arm specific Service Filters within indicated states of the Service Context State Machine (SCSM). Therefore, associated with a particular SPSM state, there may be a number of message field values that, once received at the Application Gateway Module (2), are further used to dynamically arm a specific Service Filter within an indicated SCSM state. These message field values, when matched during analysis in a certain SCSM instance, may thus provoke a 'trigger' or an 'event' enter into operation.

Under another alternative embodiment, the access to a service may be authorised without needing a control over the service progression, in which case no SPSM instance is initiated, and service session identifier, if generated, is merely used for correlation purposes at the Application Gateway Module (2).

Still with reference to FIG. 5, a response is sent (S-512) from the Authorisation Module (3) back to the Application Gateway Module (2) including at least one information element selected from:
- a service identifier that can be the originally received or a modified one;
- a service session identifier (Service_Context_ID) that identifies a service delivery in the Application Gateway Module (2) and likely also in the Authorisation Module (3) during its lifetime;
- a number of message field identifiers and corresponding values (Analyse-Info-SF-value) that are further used to arm a Service Filter 'Information-Analysis' (SF-2) within a state 'Service Active' of the applicable SCSM instance, this Service Filter being likely persistent during the service context lifetime;
- a number of message field identifiers and corresponding values (Logout-SF-value) that are further used to arm a Service Filter 'Logout' (SF-31) within a state 'Service Active' of the applicable SCSM instance, this Service Filter is usable for notifying the AM (3) when the user has done a logout, and is being likely persistent during the service progression lifetime;
- a new timeout value (Timeout-value) that is used to dynamically arm a Service Filter 'Timeout' (SF-32) already armed, by overwriting a previous timeout value statically armed, this Service Filter being likely persistent during the service progression lifetime, unless overwritten again; and
- a number of transactions to supervise, in terms of purely a number, or rather in terms of a list of specific indications.

Upon submission of this response from the Authorisation Module (3) back to the Application Gateway Module (2), the SPSM instance at the Authorisation Module (3) transitions to a state 'Active Service'.

However, provided that the service is denied, a negative answer, not shown in any drawing, is sent back to the Application Gateway Module (2) wherein the SCSM instance transitions to 'NULL' state and the SCSM instance is further terminated, or simply the SCSM instance is terminated.

Upon reception of a positive answer (S-512) in the Application Gateway Module (2), a service session identifier (Service_Context_ID) received in the response message is associated with an SCSM instance. If no service session identifier (Service_Context_ID) is received, then the service request is allowed to continue and the SCSM associated is deleted, thus having the possibility to disable the main features of the invention for those users (1; 9) and service providers (30) on which the service network operator (20) absolutely trusts.

Received Service Filters are armed as 'Event' service filters within this SCSM instance, but for the Service Filter 'Timeout' (SF-32) that, being statically armed, can be dynamically overwritten as well. The SCMS instance, then, progresses to an 'Active Service' state. The received service session identifier (Service_Context_ID) is incorporated into a Service Request being routed (S-513) towards a server (5) in charge of providing (S-514, S-515) the service requested by the user (9). To this end, an address of said server (5) may be received in the response from the Authorisation Module (3). In case a negative response was received instead, the Application Gateway Module (2), on its own, returns a negative response to the user (9) indicating that the user is not authorised to access the requested service.

In a second use case illustrated in FIG. 6 and with references also to FIG. 2, there is an exemplary invocation of a subsequent service request (S-610 to S-613) from the user and contents delivery within the same service delivery process, any of these service requests and corresponding content deliveries thus having an active service session identifier (Service_Context_ID) intended, at least, for correlation purposes within said service delivery process.

In this second use case an exemplary assumption is made on that the Authorisation Module (3) had previously included a Service Filter value (Analyse-Info-SF-value) in a response sent back (S-512) to the Application Gateway Module (2) during the authorisation process shown in FIG. 5. This Service Filter value (Analyse-Info-SF-value) was intended to arm a Service Filter at said Application Gateway Module (2) for triggering again an analysis request towards the Authorisation Module (3) when the user (9) requests a particularly specific service (serviceBIS) within the same service delivery.

Thus, while the user is accessing (S-610 to S-613) the same or another service different than the above said specific service (serviceBIS) to be specially treated, the service progression goes on with correlating the authorisation by identifying the received service session identifier (Service_Context_ID). Therefore, upon reception of an incoming message, the Application Gateway Module gets the SCSM instance through the service session identifier (Service_Context_ID) included in the message that, in this case, is in an 'Active Service' state. At this stage, the Service Filters 'Information-Analysis' (SF-2) and 'Logout' (SF-31) are evaluated for incoming message with the given service session identifier (Service_Context_ID).

Upon reception of a service request (S-614) from the user (9) requesting the above specific service (serviceBIS), the Application Gateway Module (2) encounters an armed Service Filter 'Information-Analysis' (SF-2) under the SCSM instance identified by the received service session identifier (Service_Context_ID). The service requested by the user (serviceBIS) matches the Service Filter value received (Analyse-Info-SF-value) from the Authorisation Module (3) to arm such filter, and the Application Gateway Module triggers (S-615) a specific analysis request back to the Authorisation Module as described above. This specific analysis request includes at least one element selected from: protocol used, such as for example HTTP; message type, such as for example POST; requested service (serviceBIS); a user identifier; a service session identifier (Service_Context_ID); and an applicable Service Filter applied.

The Authorisation Module receiving the analysis request (S-615) for this specific service (serviceBIS) gets the SPSM instance identified by the received service session identifier (Service_Context_ID) and, based on the particular state currently applicable, different policies might be applied to the user and requested service. In this respect, and in accordance with a currently preferred embodiment, these policies are implemented in terms of global Service Filters that may be instanced as individual Service Filters with particular attributes and assignable to particular SPSM instances. This embodiment allows a harmonised provision of global Service Filters at the Authorisation Module (3), of own applicability as well as of external applicability such as those to be settled in the Application Gateway Module (2). In another embodiment, these policies, as well as those policies originally applied to determine whether or not a service delivery can be granted, may be carried out by having processing means for determining whether a user, having been granted a complete service delivery, can presently access a particularly specific service (serviceBIS), thus marked for an additional authorisation when requested by the user.

As a result of applying at least one of these policies at the Authorisation Module (3), the access may be granted without restriction, or another specific service (serviceTER) may be returned to substitute a previous service requested (serviceBIS), or forced logout may be triggered. An example of this situation might be a user having been granted access to a 'watching-TV-service' through Internet, wherein the service includes a number of channels that can be alternatively selected by the user and that do not require further authorisation since the user's requests include a service session identifier (Service_Context_ID). In addition, this 'watching-TV-service' might eventually include another number of channels that the user can alternately select and for which the user is separately charged (serviceBIS). Therefore, upon selecting one of these latter channels, the user might be forwarded towards another service (serviceTER) where appropriate charging, login, or permission data can be requested from the user.

Then, when the Authorisation Module has processed the applicable policy to the user and service, preferably in terms of Service Filters, and has determined one of the above results: granted access, disconnection, or another service (serviceTER) being connected, the Authorisation Module returns back (S-616) to the Application Gateway Module (2) the corresponding response. The Application Gateway Module thus routes (S-617) the service request towards a server in charge of the new indicated service (serviceTER), the server being in particular the same (5) as before, and said server provides (S-618, S-619) towards the user (9) the contents suitable for the requested service.

More generally speaking, and applicable to other more sophisticated services than the one exemplary described above, the response (S-616) from the Authorisation Module to the Application Gateway Module includes at least one element selected from:

a service identifier that can be the originally received or a modified one;

a number of new message field identifiers and/or new corresponding values (Analyse-Info-SF-value) that are further used to arm a Service Filter 'Information-Analysis' (SF-2) within a state 'Service Active' of the applicable SCSM instance;

a number of new message field identifiers and/or new corresponding values (Logout-SF-value) that are further used to arm a Service Filter 'Logout' (SF-31) within a state 'Service Active' of the applicable SCSM instance; and a new timeout value (Timeout-value) that is used to dynamically arm a Service Filter 'Timeout' (SF-32) already armed, by overwriting a previous timeout value.

A third use case is illustrated in FIG. 7 also with references to FIG. 2. This third use case, as for the second use case shown if FIG. 6, starts with an exemplary invocation of a subsequent service request (S-610, S-611) from the user and contents delivery (S-612, S-613) within the same service delivery process, both service request and contents delivery including the given active service session identifier (Service_Context_ID) for correlation purposes within said service delivery process.

In this third use case illustrated in FIG. 7, the user (9) explicitly initiates a logout by sending (S-714) a Service Request indicating a desired logout (Requested serviceLOGOUT).

When receiving such logout request (S-714) at the Application Gateway Module (AGM) (2), the Service Filter 'Logout-Request' (SF-31), which was previously armed within the corresponding SCSM instance at the AGM (2) when receiving a corresponding indication from the Authorisation Module (AM) (3) during the authorisation process, or during a previous service request, is found applicable and accordingly with values (Logout-SF-value) stated for this filter, such event is communicated (S-715) to the AM (3). Therefore, the communication of such event includes at least one element selected from: protocol used, such as for example HTTP; message type, such as for example POST; requested service, such as for example a requested URI; a user identifier; a service session identifier (Service_Context_ID); and a possibly detected Service Filter.

Upon receipt of such request, the SPSM instance in the AM (3) carries out a transition from the 'Active Service' state to the 'Disconnect Service' state. The service session identifier. (Service_Context_ID) is deleted, and the SPSM instance disappears. A response is returned (S-716) to the AGM (2), and a transition also occurs at the SCSM instance from the 'Active Service' state to the 'Disconnect Service' state, as well as a deletion of references to current service session identifier (Service_Context_ID) at the SCSM instance.

If such above communication was a request, the SCSM in the AGM (2) waits for instructions (S-716) from the AM. Otherwise, in case of a notification, a transition state is carried out at the SCSM instance between 'Active Service' and 'Disconnect Service' states, without waiting for an acknowledge.

The user's logout may be, depending on particular features of the individual service delivery process, informed (S-717) to the server in charge of the service (5), which may deliver (S-718, S-719) a final content to the user such as a sort of 'good-bye' page, for example.

A fourth use case is illustrated in FIG. 8 also with references to FIG. 2. This fourth use case, as previous ones, starts with an exemplary invocation of a subsequent service request (S-610, S-611) from the user and contents delivery (S-612, S-613) within the same service delivery process with an active service session identifier (Service_Context_ID).

During this use case, the user (5) had been connected with a service (5) and has a service session identifier (Service_Context_ID) assigned, but the user has not been accessing the service during a long period. During this inactivity period an inactivity timer is running and, upon expiry, a Service Filter 'Timeout' is triggered for the applicable SCSM instance at the Application Gateway Module (AGM) (2). Then, the AGM (2) communicates such event, namely no message has traversed the AGM with a given service session identifier (Service_Context_ID), to the Authorisation Module (AM) (3), this communication (S-815) including at least one element selected from: the given service session identifier (Service_Context_ID); and detected Service Filter 'Timeout'.

Upon receipt of such communication, the correlated SPSM instance at the Authorisation Module (3) carries out a transition to the state 'Disconnect Service', deletes references to the given service session identifier (Service_Context_ID), and returns a corresponding acknowledge back (S-816) to the Application Gateway Module (AGM) (2). Upon reception of this response, the SCSM instance at the AGM goes from the 'Active Service' state to the 'Disconnect Service' state and deletes references to the given service session identifier (Service_Context_ID) as well.

Any further service request is received (S-810) from the user (5) with said deleted service session identifier (Service_Context_ID), gets back (S-819) a negative answer possibly indicating the timeout expiry or other reasons for not authorising the service request (Unauthorised).

A fifth use case is illustrated in FIG. 9 also with references to FIG. 2. This fifth use case, as previous ones, starts with an exemplary invocation of a subsequent service request (S-610, S-611) from the user and contents delivery (S-612, S-613) within the same service delivery process with an active service session identifier (Service_Context_ID).

This exemplary use case presents a mechanism whereby the Service Network Operator can drop a service progression at any time. Therefore, means are provided in the Authorisation Module (AM) (3) to set operator policies, which may be globally applicable as well as on a per user and per service basis, that allow the operator to stop an authorised service from progression through controlling means in the Authorisation Module (3). In accordance with a currently preferred embodiment already introduced above for a previous use case, these policies may be implemented in terms of global Service Filters that may be instanced as individual Service Filters with particular attributes and assignable to particular SPSM instances. Moreover, also in accordance with another embodiment already introduced above, these policies may be carried out by having processing means for determining whether a user, who had been granted a complete service delivery, can presently go on with such service. In other words, because of applying at least one of these policies at the Authorisation Module (AM) (3) a forced logout or service disconnection may be triggered towards the Application Gateway Module (AGM) (2) once a transition between the states 'Active Service' and 'Disconnect Service' is carried out at the corresponding SPSM instance, and both said SPSM instance and the service session identifier (Service_Context_ID) are terminated. Then, FIG. 9 illustrates how the AM (3) sends a disconnection request (S-908) towards the AGM (2) including at least one element selected from: user identifier, and service session identifier (Service_Context_ID).

As receiving (S-908) said disconnection request at the AGM (2), an SCSM instance is identified by using the given service session identifier (Service-Context-ID), a transition between the states 'Active Service' and 'Disconnect Service' is carried out at said SCSM instance, both said SCSM instance and given service session identifier (Service_Context_ID) are deleted, as well as references thereof, and a response is returned (S-909) back to the Authorization Module (3). As in a previous use case, any further service request is received (S-910) from the user (5) with the service session identifier (Service_Context_ID) recently terminated, gets back (S-819) a negative answer possibly indicating the reason why the service is finished (Unauthorised).

Apart from the above use cases, other application servers (7; 8) and provisioning systems, the latter not shown in any drawing, may also interwork with the Authorisation Module (3) in order to carry out actions as the ones listed below in a non-exhaustive manner:

reading data associated with a specific service instance identified by a given service session identifier, namely an SPSM instance or an SCSM instance, including data set out for applicable Service Filters within said particular service instance;

requesting disconnection of a particular service instance identified by a given service session identifier, whereby the Authorisation Module (3) upon arrival of this message fires a disconnection request to the Application Gateway Module (2); and furnishing new values applicable to a given Service Filter, in terms of at least one element selected from: a number of criteria to match and a number of actions to carry out on matching, associated with a given service instance identified by a given service session identifier, the service instance being an SPSM instance, or an SCSM instance, or both.

Those application servers (7; 8), or provisioning systems, wanting to interwork with the Authorisation Module (3) to carry out actions related with a service instance, on data or on status basis, need a service session identifier (Service_Context_ID) in order to identify said service instance.

A number of basic use cases, which are basically illustrated in FIG. 2, are described following this in an exemplary manner to better show how the use of a service by a user can be verified within the service network (20).

A first use case of a verification mechanism may be, for instance, a sort of 'Real Time Charging' for a service offered by a service network operator (20) but deployed by a third party service provider (30). In this respect, the operator is responsible for charging the user for service usage, however, the information of such service usage comes from the third party service provider (SP). The operator needs to make sure that the user to be charged is currently accessing this service. For that purpose, a Service Level Agreement (SLA) signed between an operator and a service provider states that an assigned service session identifier (Service_Context_ID), which is always included within those application messages exchanged (I-1$x$; I-2$x$; I-4$x$) between the user (1; 9) and the service server (5; 6), is also included in messages (I-6$x$) from the service provider to an operator's charging system (8) and affecting charging records therein. This service session identifier (Service_Context_ID) is used to query (I-8$x$) the Authorisation Module (3) in order to check and make sure that the given service session identifier (Service_Context_ID) belongs to an active service instance. Provided that the user account is found exhausted, the charging system (8) may trigger a disconnection request for the user towards the Authorisation Module (3) and the latter preferably applies a similar procedure as described above in a previous general use case towards the Application Gateway Module (2). Charging system (8), Authorisation Module (3), and Application Gateway Module (2), they all make use of the given service session identifier (Service_Context_ID) to identify the service instance involved, namely the SPSM instance and SCSM instance.

A second use case of a verification mechanism may be, for instance, the usage of a service enabler (7) belonging to the service network (20) by a third party service provider (30). In this respect, the service network operator may have signed a Service Level Agreement (SLA) with the third party service provider to allow the latter make use of a service enabler only when the user accesses a service that requires features provided by said service enabler. Therefore, the service network operator requires that queries (I-5$x$) from the service provider (5) to the service enabler (7) always include a service session identifier (Service_Context_ID) to identify the service instance involved, namely the SPSM instance, or the SCSM instance, or both. In a similar manner as for the previous verification mechanism, the service enabler makes use of said service session identifier (Service_Context_ID) to query (I-7$x$) the Authorisation Module (3) in order to check and make sure that the given service session identifier (Service_Context_ID) belongs to an active service instance.

Applicant's invention is described above in connection with various embodiments that are intended to be illustrative and non-restrictive. It is expected that those of ordinary skill in this art may modify these embodiments. The scope of Applicant's invention is defined by the claims in conjunction with the description and drawings, and all modifications that fall within the scope of these claims are intended to be included therein.

The invention claimed is:

1. An Application Gateway Module suitable for use in a telecommunication system wherein a service network authenticates a user and authorizes the user for accessing a service offered by a service provider, the Application Gateway Module arranged for intercepting application messages between the user and the service and for identifying said user and said service, and including:

means for obtaining an authorization decision on whether the user is allowed to access the service;

the Application Gateway Module comprising:

means for assigning a service session identifier intended to identify those application messages exchanged between the user and the service and that belong to a same service delivery authorized for said user;

means for configuring a first finite-state machine with a number of statuses intended to identify specific events in service delivery, the first finite state machine configured to control service progression means for initiating a specific instance of the first finite-state machine, said specific instance being identified by the assigned service session identifier; and means for activating service policies applicable to said specific events and resulting in a state transition in the specific instance identified by the assigned service session identifier.

2. The Application Gateway Module of claim 1, wherein the means for activating service policies include means for setting at least one element selected from a non-exhaustive list of references and attributes that comprises:

a number of message field values to match, a number of specific actions to carry out on matching, a number of timer values to run, and a number of transactions to supervise.

3. The Application Gateway Module of claim 1, wherein the means for activating service policies include means for activating a global service policy independently of any service delivery in progress.

4. The Application Gateway Module of claim 1, wherein the means for activating service policies include means for initiating an instance of a global service policy to apply as an individual service policy within a specific instance of the first finite-state machine, the individual service policy inheriting references and attributes from the global service policy.

5. The Application Gateway Module of claim 4, further comprising means for overwriting references and attributes of an individual service policy with new references and attributes during a service progression handled within a specific instance of the first finite-state machine.

6. The Application Gateway Module of claim 4, wherein a particular state is associated with a number of individual service policies within a specific instance of the first finite-state machine, said instance identified by a given service session identifier.

7. The Application Gateway Module of claim 1, wherein the means for obtaining an authorization decision include means for requesting a service authorization from an Authorization Module.

8. The Application Gateway Module of claim 7, wherein the means for activating service policies include means for receiving from the Authorization Module at least one element applicable to set a service policy, the element selected from a non-exhaustive list of references and attributes that comprises: a number of message field values to match, a number of specific actions to carry out on matching, a number of timer values to run, and a number of transactions to supervise.

9. The Application Gateway Module of claim 7, wherein the means for activating service policies includes means for receiving a global service policy from the Authorization Module.

10. The Application Gateway Module of claim 7, further comprising means for receiving references and attributes from the Authorization Module applicable to overwrite an individual service policy with new references and attributes during a service progression handled within a specific instance of the first finite-state machine.

11. The Application Gateway Module of claim 7, further comprising means for notifying to the Authorization Module a specific event in service progression.

12. The Application Gateway Module of claim 7, further comprising means for requesting from the Authorization Module a further processing to determine an appropriate action to go on with the service progression.

13. The Application Gateway Module of claim 12, further comprising means for receiving from the Authorization Module an instruction selected from: access granted without restriction, another service to substitute a previous service requested, forced logout, and indication of a state transition.

14. An Authorization Module suitable for use in a telecommunication system wherein a service network authenticates a user and authorizes the user for accessing a service offered by a service provider, the Authorization Module arranged for deciding whether a user is allowed to access a service and having:
  means for receiving a service authorization request from an Application Gateway Module; and
  means for returning to the Application Gateway Module a response on whether the user is granted access to the requested service;
  the Authorization Module comprising:
  means for generating a service session identifier intended to correlate those application messages exchanged between the user and the service and that belong to a same service delivery authorized for said user;
  means for configuring a second finite-state machine with a number of statuses intended to identify specific events in service progression, the second finite-state machine usable by the Authorization Module to act over the Application Gateway Module to control the service progression;
  means for initiating a specific instance of the second finite-state machine, said specific instance being identified by said service session identifier; and
  means for determining service policies applicable to said specific events and resulting in a state transition in the specific instance identified by the assigned service session identifier.

15. The Authorization Module of claim 14, wherein the means for generating a service session identifier comprise means for including said service session identifier in the response to be returned to the Application Gateway Module on whether the user is granted access to the requested service.

16. The Authorization Module of claim 15, further comprising means for receiving a notification, from an Application Gateway Module, indicating a specific event detected in service progression.

17. The Authorization Module of claim 15, further comprising means for receiving a request, from an Application Gateway Module, asking for an instruction to proceed with a service progression.

18. The Authorization Module of claim 17, further comprising means for sending towards the Application Gateway Module an instruction selected from: access granted without restriction, another service to substitute a previous service requested, forced logout, and indication of a state transition.

19. The Authorization Module of claim 15, further comprising means for receiving an application message from at least one entity selected from a number of application servers and provisioning systems, the application message including a given service session identifier intended to identify a specific instance of the second finite-state machine in the Authorization Module.

20. The Authorization Module of claim 14, wherein a particular state is associated with a number of service policies within a specific instance of the second finite-state machine, said instance identified by a given service session identifier.

21. The Authorization Module of claim 14, wherein the means for determining service policies comprise means for including in the response towards the Application Gateway Module at least one information element to activate a service policy within a specific state in the Application Gateway Module, said at least one information element selected from a non-exhaustive list of references and attributes that comprises:
  a number of message field values to match;
  a set of actions to carry out on matching a given message field value;
  a number of new timer values to run; and
  a number of transactions to supervise.

22. The Authorization Module of claim 21, wherein the means for including in the response towards the Application Gateway Module at least one information element to activate a service policy include means for indicating that this is a global service policy to apply independently of any service delivery in progress.

23. A method for authorizing a user of a service network to access a service offered by a service server of a service provider, the user already authenticated by the service network, the server arranged to deliver a service that comprises a plurality of transactions by exchanging a plurality of application messages with the user, the method comprising the steps of:
  obtaining a first authorization decision on whether the user is allowed to access the service;
  generating and assigning a service session identifier intended to identify those application messages exchanged between the user and the service and that belong to a same service delivery authorized for said user;

configuring at least one finite-state machine with a number of statuses intended to identify specific events in service delivery, the finite-state machine usable for controlling service progression initiating a specific instance of the at least one finite-state machine, said specific instance being identified by the assigned service session identifier; and activating service policies applicable to said specific events and resulting in a state transition in the specific instance identified by the assigned service session identifier.

24. The method of claim 23, wherein a particular state within the specific instance of the at least one finite-state machine is associated with a number of service policies.

25. The method of claim 23, wherein the step of activating service policies includes a step of setting at least one element selected from a non-exhaustive list of references and attributes that comprises: a number of message field values to match, a number of specific actions to carry out on matching, a number of timer values to run, and a number of transactions to supervise.

26. The method of claim 23, further comprising a step of receiving at the service network an application message originated at an entity selected from: a number of service servers of a service provider and a number of entities of a provisioning system, the application message including a given service session identifier intended to identify a specific instance of the at least one finite-state machine.

27. The method of claim 23, wherein the step of configuring at least one finite-state machine further comprises configuring a first finite-state machine in an Application Gateway Module and configuring a second finite-state machine in an Authorization Module.

28. An Application Gateway Module suitable for use in a telecommunication system wherein a service network authenticates a user and authorizes the user for accessing a service offered by a service provider, the Application Gateway Module arranged for intercepting application messages between the user and the service and for identifying said user and said service, the Application Gateway Module comprising:

means for obtaining an authorization decision on whether the user is allowed to access the service;

means for assigning a service session identifier intended to identify those application messages exchanged between the user and the service and that belong to a same service delivery authorized for said user;

means for configuring a first finite-state machine with a number of statuses intended to identify specific events in service delivery, the first finite state machine configured to control service progression from a null state, a service authorization state, an active service state, and a disconnect service state; and means for activating service policies applicable to said specific events and resulting in a state transition in the first finite-state machine, the activating means further comprising:

means for statically arming at least one of the service policies before arrival of a first message to invoke the service; and means for dynamically arming at least one of the service policies during the progression of the service.

* * * * *

UNITED STATES PATENT AND TRADEMARK OFFICE
CERTIFICATE OF CORRECTION

| | | |
|---|---|---|
| PATENT NO. | : 8,064,891 B2 | Page 1 of 1 |
| APPLICATION NO. | : 10/595496 | |
| DATED | : November 22, 2011 | |
| INVENTOR(S) | : Fernandez-Alonso et al. | |

It is certified that error appears in the above-identified patent and that said Letters Patent is hereby corrected as shown below:

In Column 8, Line 49, delete "an a" and insert -- and a --, therefor.

In Column 15, Line 34, delete "identifier." and insert -- identifier --, therefor.

In Column 16, Line 55, delete "(Service-Context-ID)," and insert -- (Service_Context_ID), --, therefor.

In Column 18, Line 37, in Claim 1, delete "progression" and insert -- progression; --, therefor.

In Column 21, Line 4, in Claim 23, delete "progression" and insert -- progression; --, therefor.

Signed and Sealed this
Eighth Day of May, 2012

David J. Kappos
*Director of the United States Patent and Trademark Office*